United States Patent
Parnami et al.

(10) Patent No.: US 9,330,216 B2
(45) Date of Patent: May 3, 2016

(54) INTEGRATED CIRCUIT DESIGN SYNTHESIS USING SLACK DIAGRAMS

(71) Applicants: Mohit Parnami, Noida (IN); Sorabh Sachdeva, New Delhi (IN)

(72) Inventors: Mohit Parnami, Noida (IN); Sorabh Sachdeva, New Delhi (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 71 days.

(21) Appl. No.: 14/320,589

(22) Filed: Jun. 30, 2014

(65) Prior Publication Data

US 2015/0379175 A1    Dec. 31, 2015

(51) Int. Cl.
*G06F 17/50* (2006.01)

(52) U.S. Cl.
CPC ........ *G06F 17/5045* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 5,896,301 A * | 4/1999 | Barrientos | G06F 17/5072 716/113 |
| 6,826,733 B2 | 11/2004 | Hathaway et al. | |
| 7,149,991 B2 | 12/2006 | Kovacs-Birkas et al. | |
| 7,299,434 B2 | 11/2007 | Iguchi | |
| 7,305,644 B2 | 12/2007 | Curtin et al. | |
| 7,870,525 B2 | 1/2011 | Foreman et al. | |
| 7,895,539 B2 | 2/2011 | Carney et al. | |
| 8,146,047 B2 | 3/2012 | Gregory et al. | |
| 8,281,275 B2 | 10/2012 | Tirumala | |
| 8,504,978 B1 * | 8/2013 | Bhardwaj | G06F 17/5036 716/106 |
| 2004/0205683 A1 * | 10/2004 | Kovacs-Birkas | G06F 17/5036 716/104 |
| 2010/0257499 A1 * | 10/2010 | Alpert | G06F 17/5068 716/132 |

* cited by examiner

*Primary Examiner* — A. M. Thompson
(74) *Attorney, Agent, or Firm* — Charles E. Bergere

(57) ABSTRACT

An updated integrated circuit (IC) design is generated by applying a histogram-based algorithm to an invalid, current IC design. The histogram-based algorithm includes worst negative slack (WNS) optimization followed by total negative slack (TNS) optimization. WNS optimization uses the slack histogram for the current IC design to generate an invalid, but improved, intermediate IC design. TNS optimization uses the slack histogram of the intermediate IC design to generate the updated IC design.

9 Claims, 7 Drawing Sheets

INTEGRATED CIRCUIT DESIGN SYNTHESIS USING SLACK DIAGRAMS

BACKGROUND OF THE INVENTION

The present invention relates generally to integrated circuits, and more particularly to techniques for designing integrated circuits.

In an integrated circuit (IC), signals are transferred between different pairs of sequential circuit elements, e.g., from a transmitting (a.k.a. launch) flip-flop to a receiving (a.k.a. capture) flip-flop. In order to operate properly, each signal transfer between each pair of sequential circuit elements must be completed within one clock cycle.

Slack refers to the difference between the required time and the arrival time, e.g., the difference between a clock cycle and the time taken during a signal transfer from a launch element to a capture element. In a valid IC design, each signal transfer path has slack that is either positive (indicating that the signal transfer duration is shorter than one clock cycle) or zero (indicating that the signal transfer duration is equal to one clock cycle). If one or more signal paths in an IC design have negative slack (indicating that the signal transfer duration is greater than one clock cycle), then those signal paths are referred to as failing paths, and the IC design is invalid.

Increasing market demands for high performance and low power in SoC (System on Chip) integrated circuits places a lot of focus on design-optimization techniques from synthesis through design closure. Synthesis techniques play a vital role in the choice of data path operators and gate-level optimization. With shrinking design cycles, this necessitates that synthesis tools give best QoR (Quality of Results) in terms of performance and power with minimum iterations.

In some design scenarios, top failing paths cannot be optimized further because of constraints not being mature (e.g., due to the design being in an initial phase) or design architectural issues. In such cases, the synthesis engine may leave many sub-optimal paths (paths not fully optimized) beneath the top failing paths. EDA (Electronic Design Automation) algorithms are presently coded to put high effort on the top failing paths, while the paths below them get a very low weight/effort. This can result in (i) multiple iterations between the physical implementation team and the STA (Static Timing Analysis) team and (ii) a lot of sub-optimal paths in the design. The problem is seen across SoCs with no effective solution available from the EDA industry so far.

FIG. 1 shows a high-level block/flow diagram of a conventional technique for designing an integrated circuit. In step 106, the RTL (Register Transfer Level) 102 and Lib (Library) 104 information are stitched together where the top-level design and its references are resolved. Also, during this step, data structures, based on top-level design references, are built, and the semantics of the RTL files are verified as well. The RTL and Lib databases contain the timing information of the technology cells that are used during synthesis.

In step 108, timing and design constraints are specified for the IC. In step 110, a synthesis engine is used to generate a current design for the IC. In step 112, it is determined whether the current IC design meets the timing constraints specified in step 108, including whether each signal transfer path in the current IC design has either positive or zero slack. If so, then the current IC design is valid, and the process continues to step 116, where a gate-level netlist for Placement and Routing (PnR) is generated for the current IC design.

If, however, step 112 determines that one or more of the signal transfer paths in the current IC design have negative slack, then processing returns to step 108 to modify the constraints for another iteration of the technology mapping of step 110. In some situations, the number of iterations of steps 108, 110, and 112 can become large without ever being able to generate a valid IC design. Accordingly, it would be advantageous to be able to move to the PnR step without an excessive number of iterations to address timing issues.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION OF THE INVENTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention provides a method for designing an integrated circuit (IC). The method comprises (a) generating an invalid, current design for the IC; (b) generating a current slack histogram for the current design; and (c) generating an updated design for the IC by applying a histogram-based algorithm to the current design based on the current slack histogram.

The top failing path in an invalid IC design is the signal transfer path having the worst negative slack (WNS), i.e., the negative slack having the greatest magnitude. During the design phase of an integrated circuit, a particular design can be characterized using a slack histogram, which represents the slack values for all of the different signal transfer paths in the design.

Figure 2:
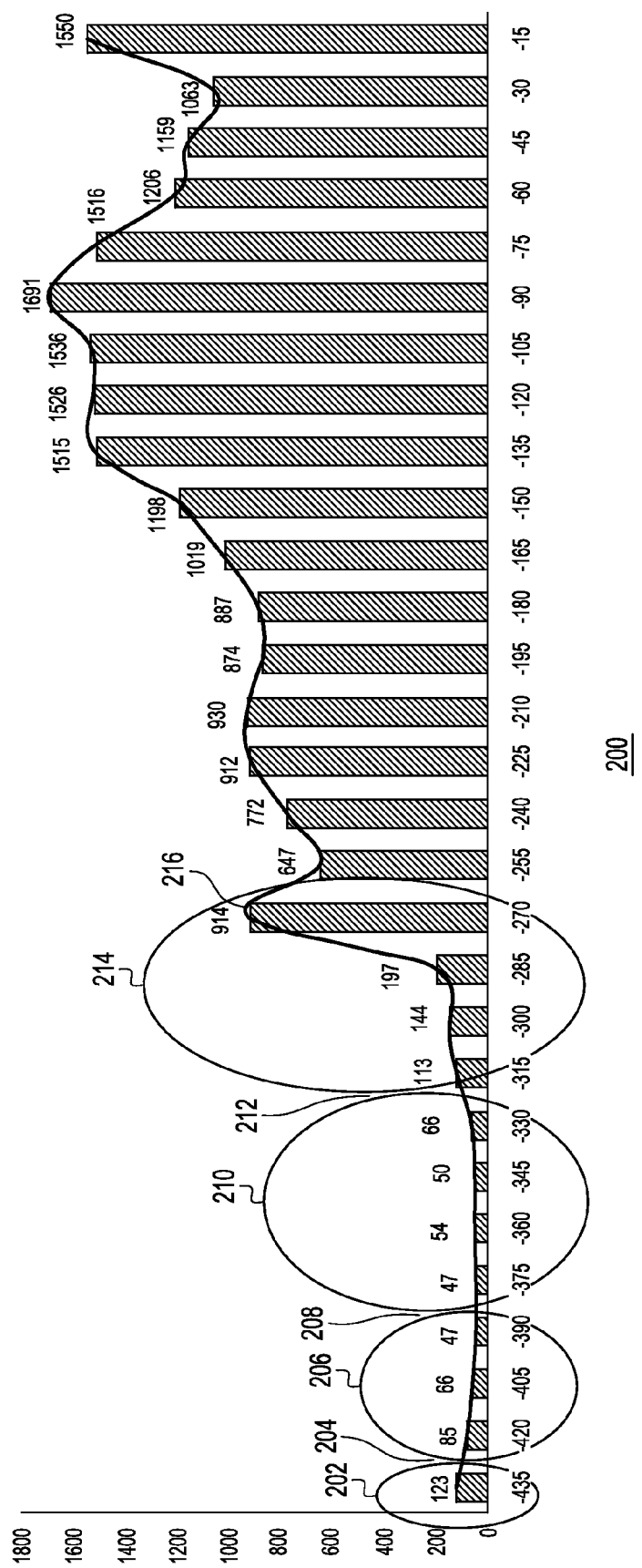
FIG. 2 shows the negative half of an exemplary slack histogram for an invalid IC design.

FIG. 2 shows the negative half of an exemplary slack histogram 200 for an invalid IC design. For this particular invalid IC design, the WNS is about −435 picoseconds, and there are 123 different signal transfer paths in that IC design having slack values that fall within the histogram bin corresponding to −435 picoseconds. The total negative slack (TNS) for a particular IC design is the sum of all of the slack values for signal transfer paths having negative slack. Thus, the TNS for the slack histogram of FIG. 2 is approximately equal to 123*(−435 ps)+85*(−420 ps)+ . . . +1550*(−15 ps).

The slack histograms can be used during the IC design phase to assess whether the IC design process is proceeding in the right direction, i.e., towards an IC design having no negative slack at all.

Conventional electronic design automation (EDA) tools focus on reducing the magnitude of the negative slack for the top failing paths in an existing IC design (i.e., those paths having WNS values). At each iteration, an EDA tool attempts to eliminate the existing top failing paths from the current IC design. Presently, optimization done by EDA tools is hindered because of top failing paths, thus impacting the overall QoR of the design. As explained previously, top failing paths cannot be optimized further because of constraints not being mature (e.g., due to the design being in an initial phase) or design architectural issues that lead to sub-optimal paths beneath the top failing paths.

The present invention is related to a histogram-based algorithm that helps in reducing WNS and/or TNS of an invalid IC design. Depending on whether WNS or TNS is used as the objective, the algorithm uses the timing slack histogram to effectively search for the sub-optimality in the IC design and optimizes the timing slack space.

Unlike conventional EDA algorithms, optimization based on a histogram-based algorithm is not hindered by any bottlenecks in the IC design (e.g., constraints or design issues) for achieving the best possible timing QoR. A typical SoC can have multiple histogram peaks and conventional EDA algorithms never use this information for optimization.

A histogram-based algorithm of the present invention not only divides the slack histogram into multiple Gaussian distributions, but also utilizes the slack histogram to detect sub-optimal zones in an IC design to achieve the improved timing QoR. Histogram-based algorithms of the present invention have been used on ARM core and SoC designs and have achieved better timing QoR as compared to traditional algorithms followed by EDA tools.

Figure 1:
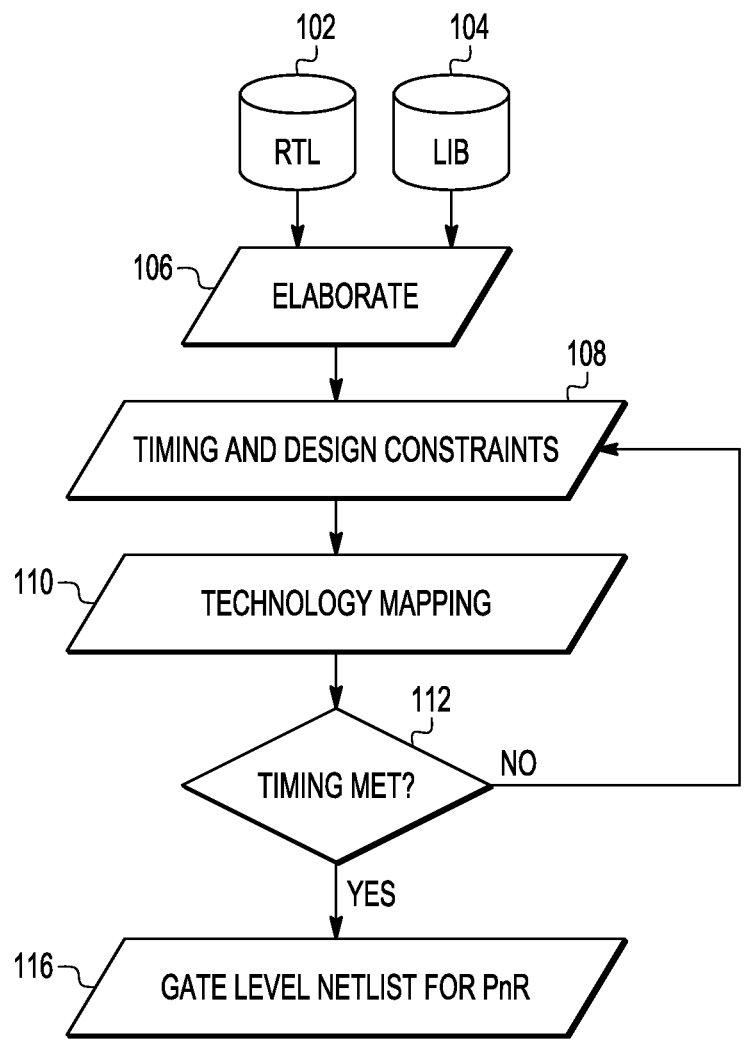
FIG. 1 shows a high-level block/flow diagram of a conventional technique for designing an integrated circuit.
Figure 3:
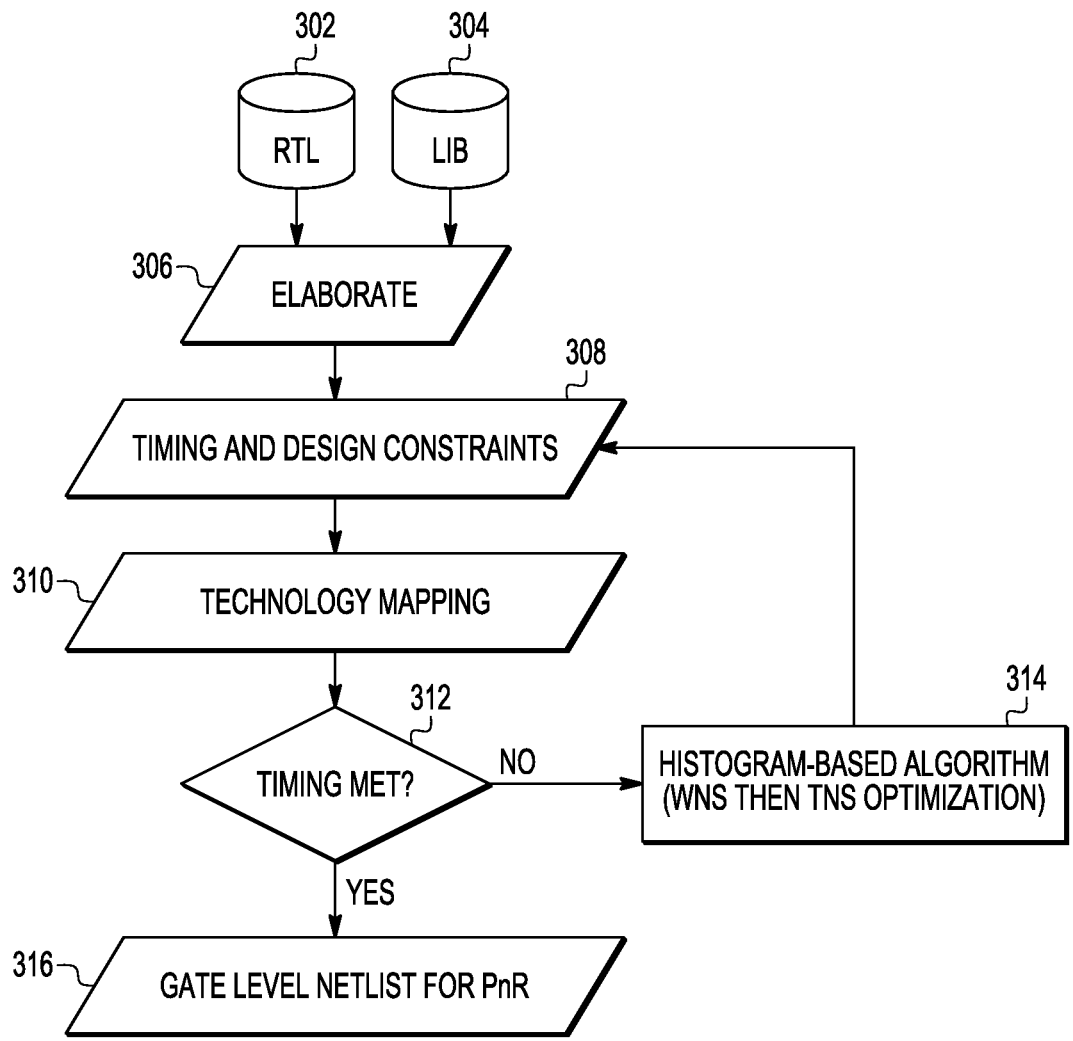
FIG. 3 shows a high-level block/flow diagram of a technique for designing an integrated circuit, according to one embodiment of the present invention.

FIG. 3 shows a high-level block/flow diagram of a technique for designing an integrated circuit according to one embodiment of the present invention. Steps 306-316 of FIG. 3 are similar to corresponding steps 106-116 of FIG. 1. The main difference is that, when a current IC design fails step 312, instead of returning directly to step 308 (as was done in FIG. 1), processing proceeds to the histogram-based algorithm 314 of the present invention before returning to step 308 in order to update the design or timing constraints to deal with the remaining top failing paths.

The preferred histogram-based algorithm is a two-phase approach for effective WNS and TNS optimization during synthesis. The first phase, called WNS optimization, focuses on WNS reduction by optimizing the top failing paths. This WNS reduction is used to analyze the current IC design to check the maximum possible frequency (i.e., core frequency) and constraints development. The second phase, called TNS optimization, focuses on TNS reduction by optimizing all of the remaining failing paths in the updated IC design generated during WNS optimization.

The following discussion is presented using exemplary slack histogram 200 of FIG. 2.

The WNS-optimization phase considers a given slack histogram 200 as multiple Gaussian distributions. The algorithm considers the portion of slack histogram 200 corresponding to the top failing paths (i.e., the 123 WNS paths having a WNS value of about −435 ps) to be the peak 202 of the first Gaussian distribution in slack histogram 200.

The algorithm then traverses slack histogram 200 towards less-negative paths (i.e., to the right in FIG. 2) to identify the next significant peak 216 at −270 ps as the center of the second Gaussian distribution in slack histogram 200. Significant peaks may be identified by comparing the numbers of paths in three consecutive histogram bins to identify situations in which the middle bin has a number of paths significantly larger (e.g., greater than some threshold difference) than its two adjacent bins. Note that the peak at −360 ps is considered to be insignificant and is therefore ignored by the algorithm, because the number of paths (i.e., 54) of that bin is not sufficiently larger than the 47 and 50 paths of the two adjacent bins.

The algorithm considers the second peak 216 to be the mean of a normal Gaussian distribution. The algorithm considers the endpoint 204 just after the first peak 202 to be the −3σ point of this second Gaussian distribution in slack histogram 200.

The algorithm then evenly divides the bins of the histogram between that −3σ point 204 and the mean point 216 into the following three different cost groups (CGs) having the following graded weights:

First CG 206 between the −3σ point 204 and the −2σ point 208 (i.e., paths having slack values greater than or equal to about −420 ps and lower than about −370 ps) having the highest graded weight of, for example, 10;

Second CG 210 between the −2σ point 208 and the −1σ point 212 (i.e., paths having slack values greater than or equal to about −370 ps and lower than about −320 ps) having the lesser graded weight of, for example, 8; and Third CG 214 between the −1σ point 212 and the mean point 216 (i.e., paths having slack values greater than or equal to about −320 ps and lower than or equal to about −270 ps) having the still lesser graded weight of, for example, 6.

The bin at −435 ps corresponding to the first peak 202 forms the top cost group CG_TOP having the lowest weight of, for example, 1.

The algorithm then executes incremental timing optimization with the weights assigned to different cost groups. The incremental timing optimization shifts the focus towards those paths having greater weights assigned. Incremental timing optimization can be described as running another round of timing optimization. The optimization refers to logical restructuring of failing paths by resizing, buffering, or logical transformations in order to reduce the magnitude of the negative slack value of a violating path.

Figure 4:
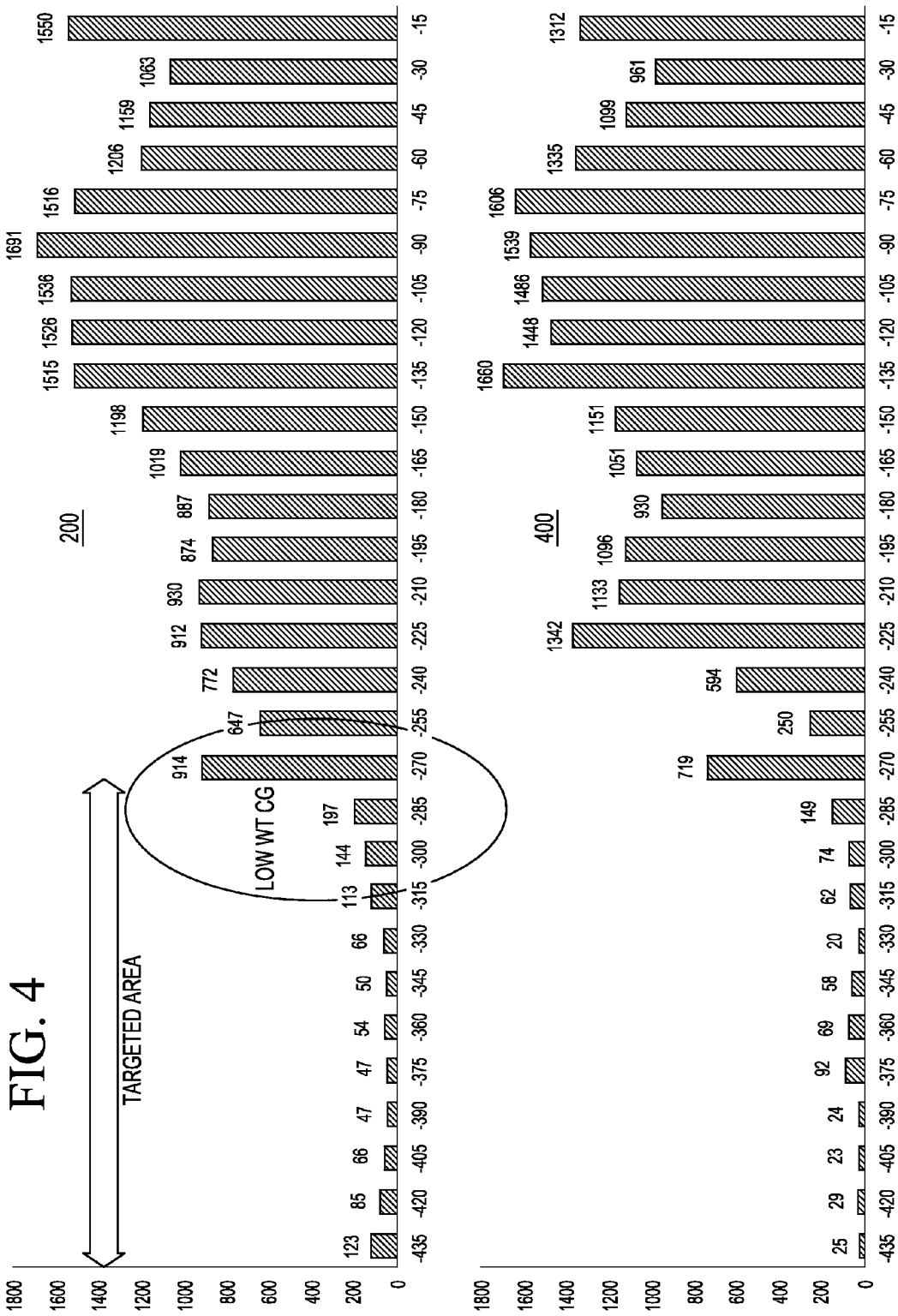
FIG. 4 shows a comparison of the slack histogram of FIG. 2 and the resulting slack histogram that is generated by applying WNS optimization to the slack histogram of FIG. 2.

FIG. 4 shows a comparison of slack histogram 200 of FIG. 2 and the slack histogram 400 that is generated by applying WNS optimization in accordance with the present invention to slack histogram 200 of FIG. 2. As shown in FIG. 4, the failing paths in slack histogram 400 are partially shifted to the right side (i.e., lower-magnitude negative slack) as compare to those in slack histogram 200.

As described previously with respect of FIG. 2, the bin at −435 ps in slack histogram 200 corresponds to the top cost group CG_TOP, and the three bins at −420 ps, −405 ps, and −390 ps correspond to the first cost group 206 in slack histogram 200. As shown in FIG. 4, the number of failing paths in those four bins of slack histogram 400 is significantly smaller than the number of failing paths in those same four bins of slack histogram 200.

Following the first phase of the WNS optimization, the second phase of TNS optimization is performed. The objective of TNS optimization is to continue to push the slack histogram towards the right side and to reduce the histogram peaks.

In TNS optimization, the algorithm masks away the top failing paths (i.e., the WNS paths) by pushing them under the top cost group CG_TOP having the lowest weight. For the rest of the paths in the slack histogram, the algorithm finds high-density/concentration zones of negative slack in the design space. The algorithm divides the design space into multiple high-density buckets to be used by an optimizer.

The algorithm calculates WNS-based Z-scores and TNS-based Z-scores. A Z-score (aka standard score or Z) is a measure of the divergence of a data point (X) from the most probable data point value (i.e., the mean value) and is expressed in terms of the number of standard deviations ($\sigma$) from the mean value ($\mu$). Thus, $Z=(X-\mu)/\sigma$. The Z-score tells if a data point is high or low and by how much. Z-scores greater than zero are above average, while Z-scores less than zero are below average.

A WNS-based Z-score is directly calculated using the slack histogram, where X is a particular slack value along the x axis, and the standard deviation $\sigma$ and mean value $\mu$ are calculated based on the area under the slack histogram. A TNS-based Z-score is calculated using a "TNS-contribution" curve in which the y axis represents the contribution of each slack value to the TNS, where that TNS contribution is the product of a slack value and the number of data paths having that slack value (i.e., the y axis value in the slack histogram). For the TNS-based Z-score, X is again a particular slack value along the x axis, and the standard deviation $\sigma$ and mean value $\mu$ are calculated based on the area under the TNS-contribution curve.

The more negative the Z-score, the higher the gravity or heaviness of the data point and the more contribution to the TNS value by the data point. The more positive the Z-score, the lighter the data point. Z-scores are used to standardize scores from different groups of data points. Z-scores help in shadowing away the effect of low WNS points with higher FEP (timing end point) count (i.e., discarding paths having low-magnitude, negative WNS values that could easily fade away during the placement and routing stage). In general, there may be many paths having low-magnitude, negative WNS values that can contribute significantly to the TNS value, but which correspond to histogram bins that are not the focus of optimization.

TNS can be a misleading factor in deciding the contents of the buckets. The solution is to include the impact of WNS by calculating the Z-scores for both TNS and WNS using the same formula presented above.

The gravity (or heaviness) of every data point in the slack histogram depends upon the combined Z-scores for both TNS and WNS. The algorithm forms a separate cost group for data points with very large-magnitude negative TNS-based Z-scores (e.g., less than or equal to −1.0). For those data points, the algorithm finds the corresponding WNS-based Z-score. If the WNS-based Z-score is, e.g., greater than 1.0, then the algorithm calculates an effective TNS by dividing the original TNS by the WNS-based Z-score, and the new, effective TNS is bucketed accordingly.

The algorithm merges the remaining data points in the slack histogram until they achieve the gravity/heaviness of high-Z-score (e.g., less than or equal to −1.0) data points. The algorithm keeps adding consecutive data points until the condition $(X1+X2+ \ldots +Xn<\mu-\sigma)$ is not met. At that point, the algorithm forms a cost group consisting of that set of data points $(X1, X2, \ldots, Xn)$. The process is then repeated until all of the data points in the slack histogram are in cost groups. The algorithm assigns equal weights to all of the cost groups, except for the top cost group CG_TOP, which has the lowest weight assigned by the algorithm.

Figure 5:
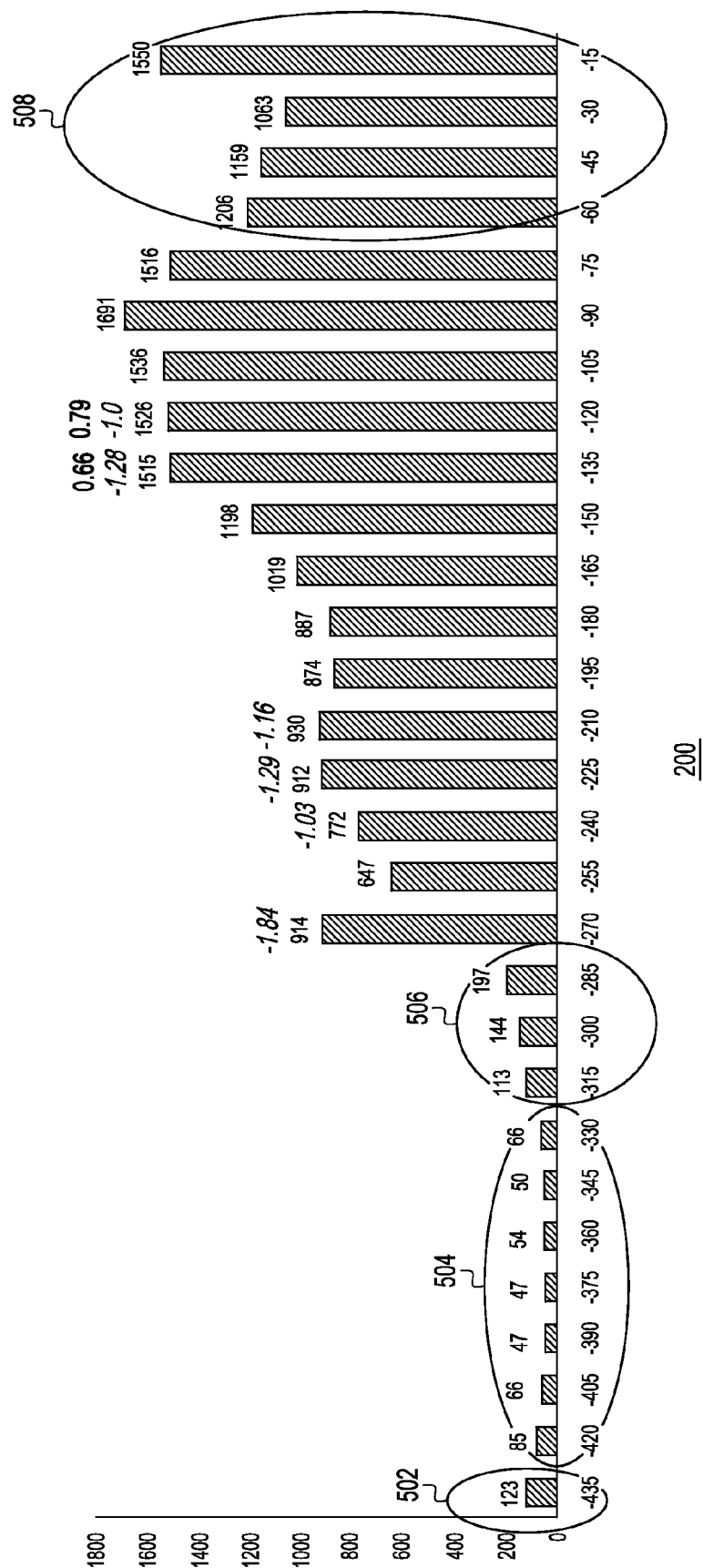
FIG. 5 shows the cost-group clustering of TNS optimization applied to the slack histogram of FIG. 2.

FIG. 5 shows the cost-group clustering of TNS optimization applied to slack histogram 200 of FIG. 2. In particular, FIG. 5 shows cost groups 504, 506, and 508 in addition to the top cost group CG_TOP 502. Although FIG. 5 shows TNS optimization applied to slack histogram 200, in a preferred implementation, TNS optimization is applied to the results of WNS optimization (e.g., slack histogram 400 of FIG. 4). FIG. 5 is intended merely to demonstrate the operations of TNS optimization. Note that WNS and TNS optimization are independent operations that can be performed separately, although WNS optimization is preferably followed by TNS optimization.

The algorithm then executes incremental timing optimization with the weights applied as per the TNS-based Z-scores.

Figure 6:
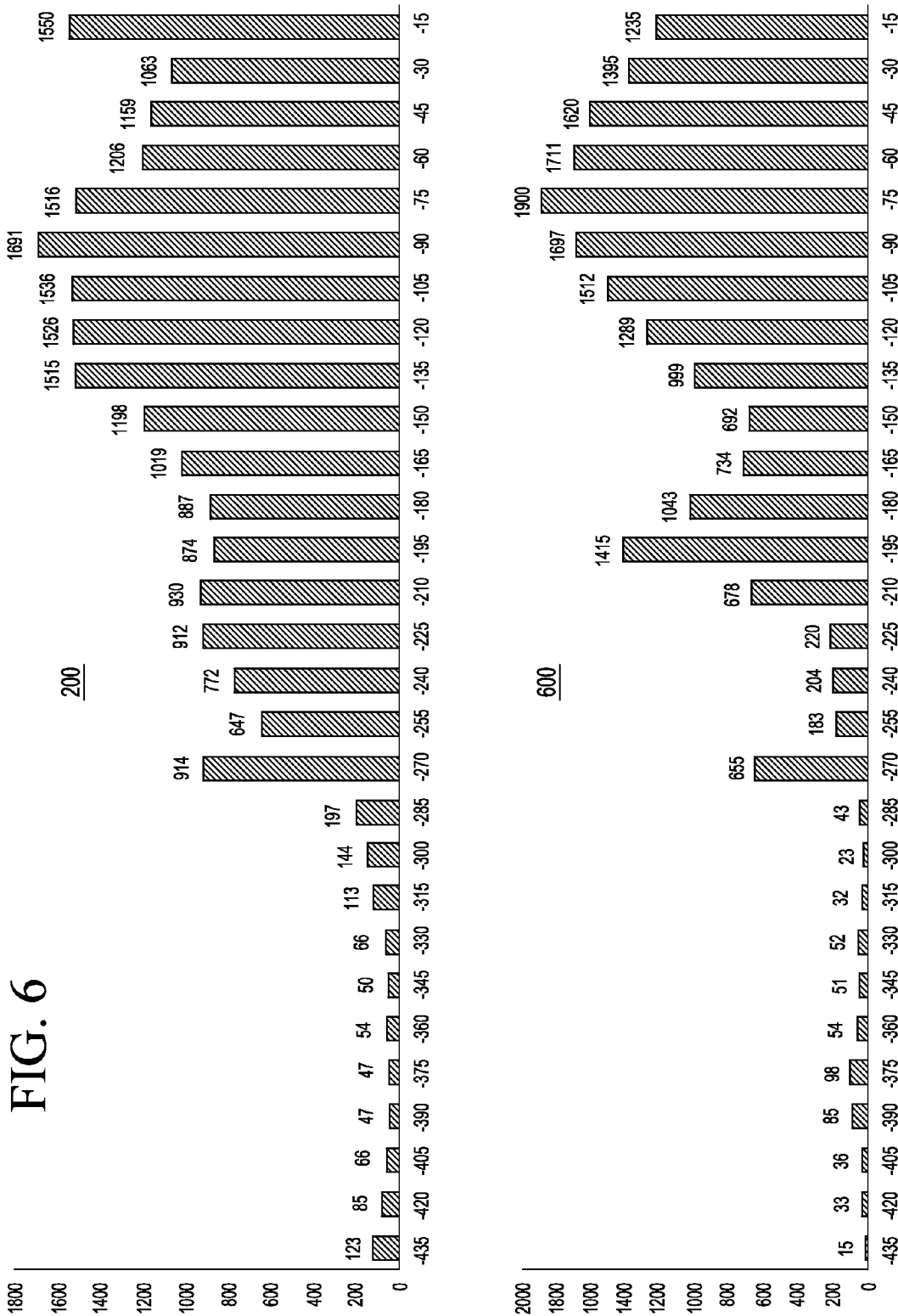
FIG. 6 shows a comparison of the slack histogram of FIG. 2 and the slack histogram that is generated by applying TNS optimization in accordance with the present invention to the slack histogram of FIG. 2.

FIG. 6 shows a comparison of slack histogram 200 of FIG. 2 and the slack histogram 600 that is generated by applying TNS optimization in accordance with the present invention to slack histogram 200 of FIG. 2. Like the WNS optimization described previously, TNS optimization shifts the slack histogram to the right and reduces the histogram peaks. WNS and TNS optimization bring the negative slack much lower compared to conventional approaches that work only on the top failing paths. Following WNS and TNS optimization, remaining top failing paths are addressed by updating timing and/or design constraints (as in step 308 of FIG. 3). The use of WNS and TNS optimization can accelerate the overall design process.

In certain embodiments of the present invention, the histogram-based algorithm utilizes information from the slack histogram for a current IC design and assigns weights to paths that are sub-optimal so as to improve the TNS of the IC design. Information in the slack histogram is decoded to further optimize the IC design so that the TNS can be improved. The algorithms spend more time in analyzing actual violating paths than on the sub-optimal paths.

Actual violating paths are paths that violate because of constraints not being mature (due to the design being in an initial phase) or design architectural issues. Whereas, sub-optimal paths are paths that are not fully optimized by the EDA tool. Sub-optimal paths have negative slack but not necessarily because of timing constraints. They could have negative slack because the EDA tool could not focus much on these paths during optimization because of the focus placed on the top failing paths.

Histogram-based algorithms of the present invention can be applied to the design of SoCs having an initial set of constraints so that maximum concentration can be spent on actual violating paths and not on sub-optimal paths, making the optimization cycle iterative after every constraint update.

Although the present invention has been described in the context of a histogram-based algorithm that involves WNS optimization followed by TNS optimization, in other embodiments, a histogram-based algorithm might involve only one of WNS and TNS optimization.

Figure 7:
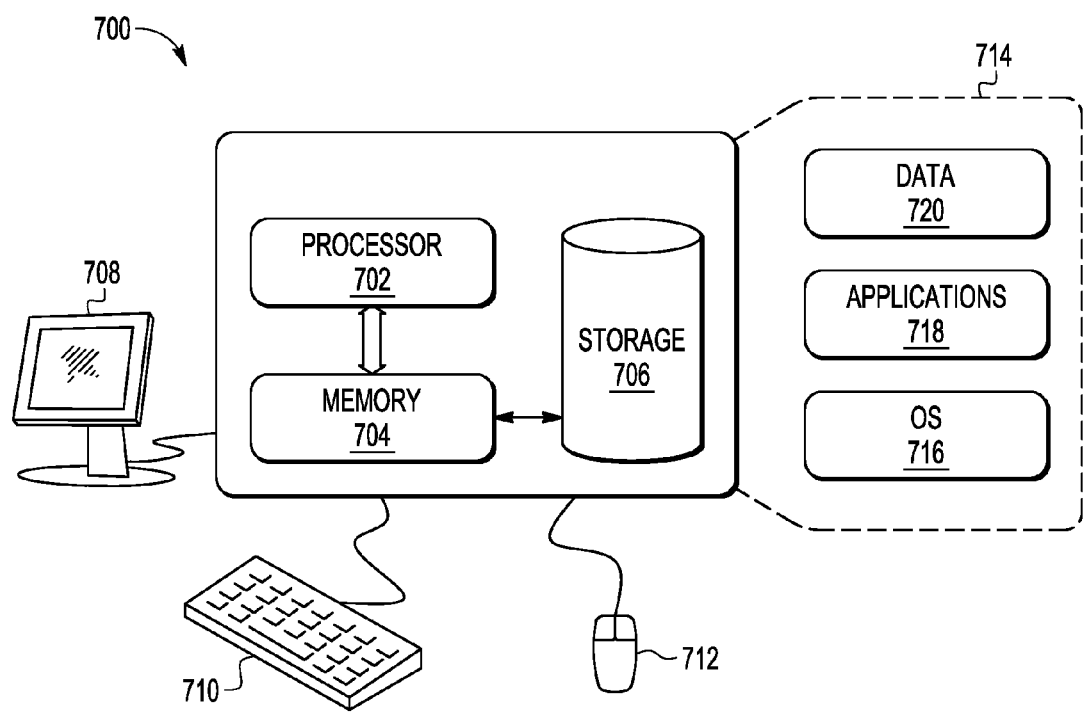
FIG. 7 shows an exemplary computer system for implementing the design technique of FIG. 3.

FIG. 7 is a schematic block diagram of an exemplary computer system 700 for performing the methods of the present invention described above. The computer system 700 includes a processor 702 coupled to a memory 704 and additional memory or storage 706 coupled to the memory 704. The computer system 700 also includes a display device 708, input devices 710 and 712, and software 714. The software 714 includes operating system software 716, applications programs 718, and data 720. The applications programs 718 can include, among other things, a histogram-based optimizer that implements the WNS and TNS optimization algorithms of step 314, and the data 720 can include the inputs and outputs from the various processing step shown in FIG. 3.

The computer system 700 and the constituent parts are all well known in the art, and the novelty resides in the methods and steps described above regarding gate level simulation. When software or a program is executing on the processor 702, the processor becomes a "means-for" performing the steps or instructions of the software or application code running on the processor 702. That is, for different instructions and different data associated with the instructions, the internal circuitry of the processor 702 takes on different states due to different register values, etc., as is known in the art. Thus, any means-for structures described herein relate to the processor 702 as it performs the steps of the methods disclosed herein.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. A method for designing an integrated circuit (IC), the method comprising:
   generating a current design for the IC using a computer system;
   generating a current slack histogram for the current design using the computer system; and
   generating an updated design for the IC by applying a histogram-based algorithm to the current design based on the current slack histogram, using the computer system,
   wherein the histogram-based algorithm comprises a worst negative slack (WNS) optimization followed by a total negative slack (TNS) optimization.

2. The method of claim 1, wherein the updated design has a TNS having a smaller magnitude than the TNS of the current design.

3. The method of claim 1, further comprising fabricating the IC based on the updated design.

4. The method of claim 1, wherein the WNS optimization comprises:
   designating a bin in the current slack histogram corresponding to top failing paths in the current design as the peak of a first Gaussian distribution in the current slack histogram;
   designating a bin in the current slack histogram corresponding to a next significant peak in the current slack histogram as the peak of a second Gaussian distribution in the current slack histogram;
   dividing the portion of the current slack histogram between the peaks of the first and second Gaussian distributions into a plurality of different cost groups, wherein the top failing paths in the current design are assigned to a top cost group of the plurality of different cost groups;
   assigning a weight value to each cost group of the plurality of different cost groups; and
   applying incremental timing optimization based on the cost groups and assigned weight values to generate the updated design.

5. The method of claim 4, wherein:
   a lowest weight value is assigned to the top cost group;
   a highest weight value is assigned to the cost group next to the top cost group; and
   a lesser weight value is assigned to each successive cost group.

6. The method of claim 1, wherein the TNS optimization comprises:
   generating a TNS contribution curve from the current slack histogram;
   designating a point in the TNS contribution curve corresponding to top failing paths in the current design as the peak of a first Gaussian distribution in the TNS contribution curve;
   designating a point in the TNS contribution curve corresponding to a next significant peak in the TNS contribution curve as the peak of a second Gaussian distribution in the TNS contribution curve;
   dividing the portion of the TNS contribution curve between the peaks of the first and second Gaussian distributions into a plurality of different cost groups, wherein the top failing paths in the current design are assigned to a top cost group of the plurality of different costs groups;
   assigning a weight value to each cost group of the plurality of different cost groups; and
   applying incremental timing optimization based on cost groups and assigned weight values to generate the updated design.

7. The method of claim 1, wherein generating an updated design comprises:
   applying WNS optimization to the current design based on the current slack histogram to generate an invalid, intermediate design for the IC;
   generating an intermediate slack histogram for the intermediate design; and applying TNS optimization to the intermediate design based on the intermediate slack histogram to generate the updated design.

8. The method of claim 1, further comprising:

updating at least one of timing constraints and design constraints for the updated design to generate a further updated design;

performing technology mapping on the further updated design;

determining whether the further updated design satisfies timing requirements for the IC; and repeating generating an updated design, updating at least one of timing constraints, technology mapping, and determining if the further updated design does not satisfy the timing requirements for the IC.

9. The method of claim 8, wherein generating an updated design, updating at least one of timing constraints, technology mapping, and determining are repeated until the further updated design does satisfy the timing requirements for the IC.

* * * * *